(12) United States Patent
Yamaguchi et al.

(10) Patent No.: US 7,558,662 B2
(45) Date of Patent: Jul. 7, 2009

(54) VEHICULAR DRIVING CONTROL APPARATUS AND METHOD

(75) Inventors: Naoshi Yamaguchi, Kanagawa (JP); Mitsuo Sasaki, Kanagawa (JP); Kazuya Yamano, Kanagawa (JP); Toru Takahashi, Kanagawa (JP); Motohiro Higuma, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 537 days.

(21) Appl. No.: 11/488,725

(22) Filed: Jul. 19, 2006

(65) Prior Publication Data

US 2007/0032937 A1 Feb. 8, 2007

(30) Foreign Application Priority Data

Aug. 4, 2005 (JP) ............................. 2005-226058

(51) Int. Cl.
*B62T 8/24* (2006.01)
*B62D 5/00* (2006.01)
*G06F 19/00* (2006.01)

(52) U.S. Cl. ..................... 701/70; 701/41; 701/91; 701/94; 180/412; 180/413

(58) Field of Classification Search .................. 701/70, 701/69, 72, 91, 94, 41; 180/408, 412, 413, 180/417; 303/149
See application file for complete search history.

(56) References Cited

U.S. PATENT DOCUMENTS

| 6,256,561 | B1 * | 7/2001 | Asanuma ................. 701/41 |
| 2005/0228564 | A1 * | 10/2005 | Kato et al. ............... 701/41 |
| 2007/0001510 | A1 * | 1/2007 | Miller .................... 303/149 |
| 2007/0239333 | A1 * | 10/2007 | Galkowski et al. ....... 701/41 |

FOREIGN PATENT DOCUMENTS

JP 2000-062594 A 2/2000

* cited by examiner

*Primary Examiner*—Tan Q Nguyen
(74) *Attorney, Agent, or Firm*—Foley & Lardner LLP

(57) ABSTRACT

In vehicular driving control apparatus and method, a steering assistance force provided for steerable road wheels of the vehicle in a direction at which a sideslip angle is decreased when a vehicular sideslip angle which is a difference between a forwarding direction of the vehicle and a steering direction of a steering wheel of the vehicle is detected and a vehicular oversteer state is detected, and thereafter, each of road wheels of the vehicle is controlled to decrease the sideslip angle when the steering assistance force is provided in a direction at which the vehicular sideslip angle is decreased and when the sideslip angle is equal to or larger than a predetermined value.

19 Claims, 7 Drawing Sheets

VEHICULAR DRIVING CONTROL APPARATUS AND METHOD

BACKGROUND OF THE INVENTION (a) Field of the Invention

The present invention relates to a vehicular driving (or may be called traveling) control apparatus and method which control a vehicular sideslip angle.

(b) Description of the Related Art

A previously proposed vehicular driving control apparatus is exemplified by a Japanese Patent Application First Publication (Tokkai) No. 2000-062594 published on Feb. 29, 2000. In this previously proposed driving control apparatus, a vehicular sideslip angle α is calculated from an equation representing a relationship from among a yaw rate, a lateral acceleration, and a vehicle speed and a braking force control for each of front and rear and left and right road wheels (longitudinal and lateral) road wheels is carried out to suppress a skid (or sideslip) and a spin of the vehicle.

SUMMARY OF THE INVENTION

However, in the previously proposed vehicular driving control apparatus described above, the vehicular sideslip angle and a road surface-tire frictional coefficient are estimated on the basis of a detection value of a lateral acceleration sensor. Hence, the detection value of the lateral acceleration sensor in a case where the vehicle is traveling on a corner cant road surface becomes smaller than that in a case where the vehicle is traveling on a flat road surface. Thus, the previously proposed vehicular driving control apparatus described above erroneously determines that the lateral acceleration is small with respect to the vehicular yaw rate and the vehicle is in a spin state, the road surface frictional force is estimated to be lower than its actual value. The road surface frictional force is estimated to be lower than its actual value. Thus, an unnecessary braking force control is executed and a traveling feeling of a vehicle driver does not become favorable (namely, an unpleasant feeling is given to the vehicle driver).

It is, therefore, an object of the present invention to provide vehicular driving control apparatus and method which improve the vehicle driver's traveling feeling by not performing an unnecessary braking force control even if the lateral acceleration sensor carries out an erroneous detection of the lateral acceleration on such a cant road surface as described above.

To achieve the above-described object, according to an aspect of the present invention, there is provided a vehicular driving control apparatus, comprising: a sideslip angle detection circuit configured to detect a vehicular sideslip angle which is a difference between a vehicular forwarding direction and a steering direction of a steering wheel of the vehicle and configured to detect an oversteer state of the vehicle; a steering assistance mechanism configured to provide a first steering assistance force for the steering wheel; and a road wheel speed control mechanism configured to control at least one of a driving force and a braking force for each of road wheels of the vehicle to decrease a slip of the vehicle, the steering assistance mechanism developing a second steering assistance force in a direction at which the sideslip angle is decreased when the sideslip angle detection circuit detects the sideslip angle and the oversteer state, and the road wheel speed controlling mechanism controlling each of the road wheels to decrease the sideslip angle when the steering assistance mechanism develops the second steering assistance force in a direction to decrease the sideslip angle and the sideslip angle is equal to or larger than a predetermined value.

To achieve the above-described object, according to another aspect of the present invention, there is provided a vehicular driving control method comprising steps of a first step of providing a steering assistance force for steerable road wheels of the vehicle in a direction at which a sideslip angle is decreased when a vehicular sideslip angle which is a difference between a forwarding direction of the vehicle and a steering direction of a steering wheel of the vehicle is detected and a vehicular oversteer state is detected; and a second step of controlling each of road wheels of the vehicle to decrease the sideslip angle when the steering assistance force is provided in a direction at which the vehicular sideslip angle is decreased and when the sideslip angle is equal to or larger than a predetermined value.

To achieve the above-described object, according to a still another aspect of the present invention, there is provided a vehicular driving force control apparatus comprising: sideslip angle detecting means for detecting a sideslip angle which is a difference between a forwarding direction of the vehicle and a steering direction of a steering wheel of the vehicle and detecting a vehicular oversteer state; steering assistance means for providing a first steering assistance force for the steering wheel; and road wheel speed controlling means for controlling at least one of a driving force and a braking force of each of road wheels to decrease a slip of the vehicle, the steering assistance means, when the sideslip angle and the vehicular oversteer state are detected by the sideslip angle detecting means, developing a second steering assistance force in a direction to decrease the sideslip angle, and the road wheel speed controlling means developing the second steering assistance force both when the second steering assistance force is developed in a direction to decrease the sideslip angle and the sideslip angle is equal to or larger than a predetermined value.

To achieve the above-described object, according to a further another aspect of the present invention, there is provided a vehicular driving control apparatus comprising: a sideslip angle detection circuit configured to detect a vehicular sideslip angle which is a difference between a forwarding direction of the vehicle and a steering direction of the vehicle and configured to detect an oversteer state of the vehicle; and a road wheel speed control mechanism for controlling at least one of a driving force and a braking force for each of road wheels of the vehicle to decrease a slip of the vehicle, the steering assistance mechanism detecting the sideslip angle by means of the sideslip angle detection circuit and developing the second steering force in a direction for the sideslip angle to be decreased when both the sideslip angle is detected and the vehicular oversteer state is detected by the sideslip angle detection circuit, and the road wheel speed controlling mechanism, when the steering assistance mechanism develops the second steering assistance force in the direction at which the sideslip angle is decreased and when the sideslip angle is equal to or larger than a predetermined value, controlling each of the road wheels to decease the sideslip angle.

This summary of the invention does not necessarily describe all necessary features so that the present invention may also be a sub-combination of these described features.

Other objects and advantages will be apparent from the ensuring specification and drawings.

DETAILED DESCRIPTION OF THE INVENTION

Reference will hereinafter be made to the drawings in order to facilitate a better understanding of the present invention.

FIRST EMBODIMENT

[System Configuration of a Vehicular Driving Control Apparatus According to the Present Invention]

Figure 1:
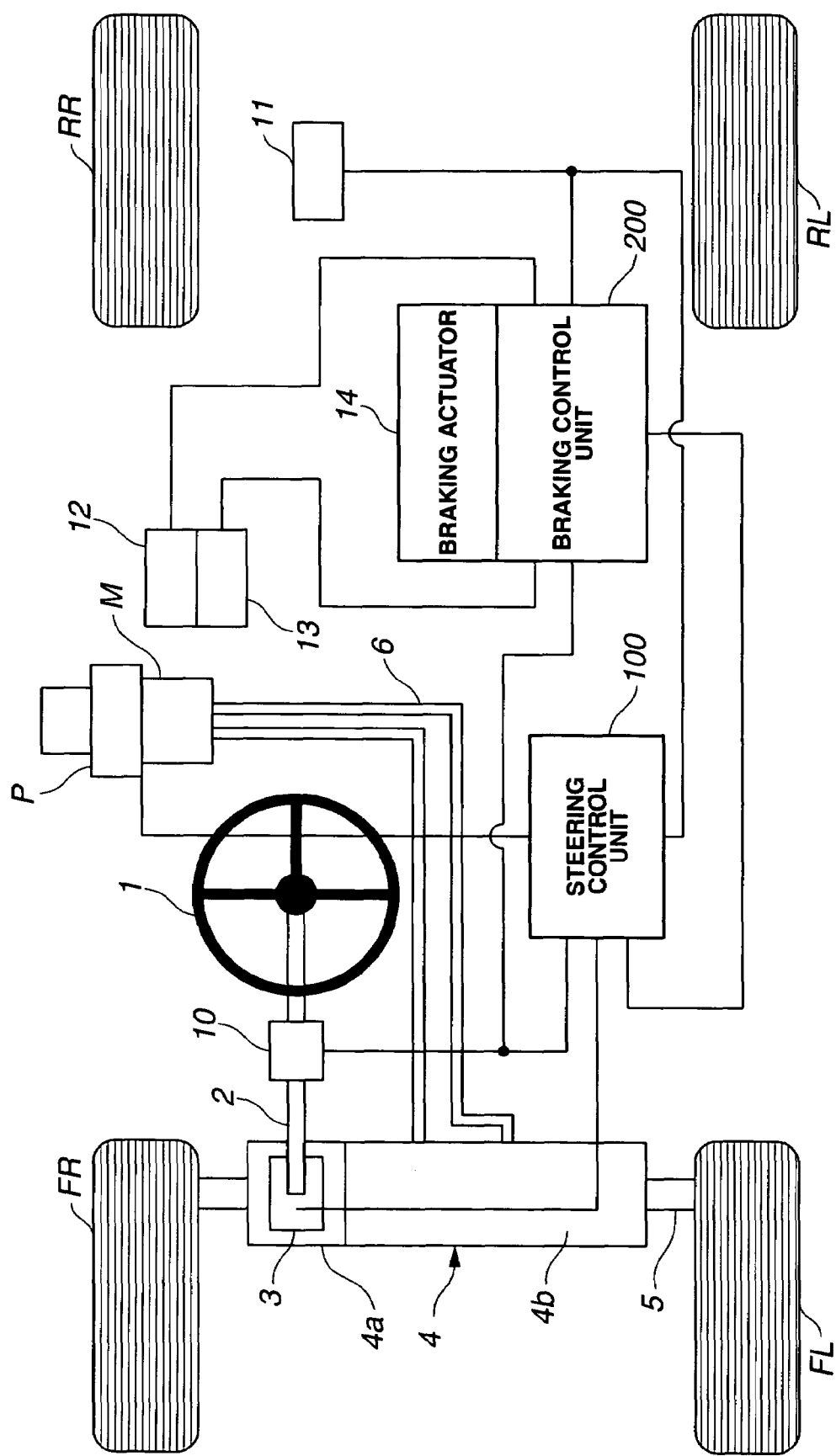
FIG. 1 is a system configuration view of an automotive vehicle to which a vehicular driving control apparatus in a preferred embodiment according to the present invention is applicable.

FIGS. 1 through 10 show a first preferred embodiment of a vehicular driving control apparatus according to the present invention. Especially, FIG. 1 shows a system configuration of a vehicle to which the first embodiment of the vehicular driving control apparatus is applicable.

When a vehicle driver operates a steering wheel 1, front road wheels (steerable road wheels) FL, FR by means of a, so-called, rack-and-pinion mechanism 4 via a shaft 2. A steering torque caused by the vehicle driver is detected by means of a torque sensor 3 and a torque signal is outputted from torque sensor 3 to a steering control unit 100. A steering angle sensor 10 is disposed on shaft 2 to detect a steering angle θ, steering angle θ being outputted to a steering control unit 100 (steering assistance section (means)) and braking control unit 200 (road wheel speed controlling section (means)).

A rack-and-pinion mechanism 4 is a power steering mechanism that generates an assistance torque in accordance with the steering torque of the vehicle driver. Left and right cylinders 4a, 4b partitioned in an axial direction are connected to an electric motor M and a bi-directional pump P via respective oil passages 6. Motor M is driven in response to a command issued from steering control unit 100. Bi-directional pump P causes pressures within left and right cylinders 4a, 4b to be varied so that a rack axle 5 is moved in an axial direction thereof to provide an assistance torque for front left and right (steerable) road wheels FL, FR.

Steering control unit 100 calculates a target assistance torque command value T* on the basis of a torsion bar torque T, steering angle θ, and road wheel speeds VSP inputted from torque sensor 3, steering angle sensor 10, and a road wheel speed sensor 11, respectively, and drives electric motor M on the basis of target assistance torque command value T*.

Braking control unit 200 drives a baking actuator 14 on the basis of steering angle θ, road wheel speeds VSP, yaw rate γ', and a lateral acceleration YG inputted from steering angle sensor 10, road wheel speed sensor 11, a yaw rate sensor 12, and lateral acceleration sensor 13 and controls a braking force of each of road wheels FL through RR. It is noted that, in the first embodiment, a cooperation (or coordination) control between steering control unit 100 and braking control unit 200 is performed to optimize a vehicular motion.

[Details of Steering Control Unit and Braking Control Unit]

Figure 2:
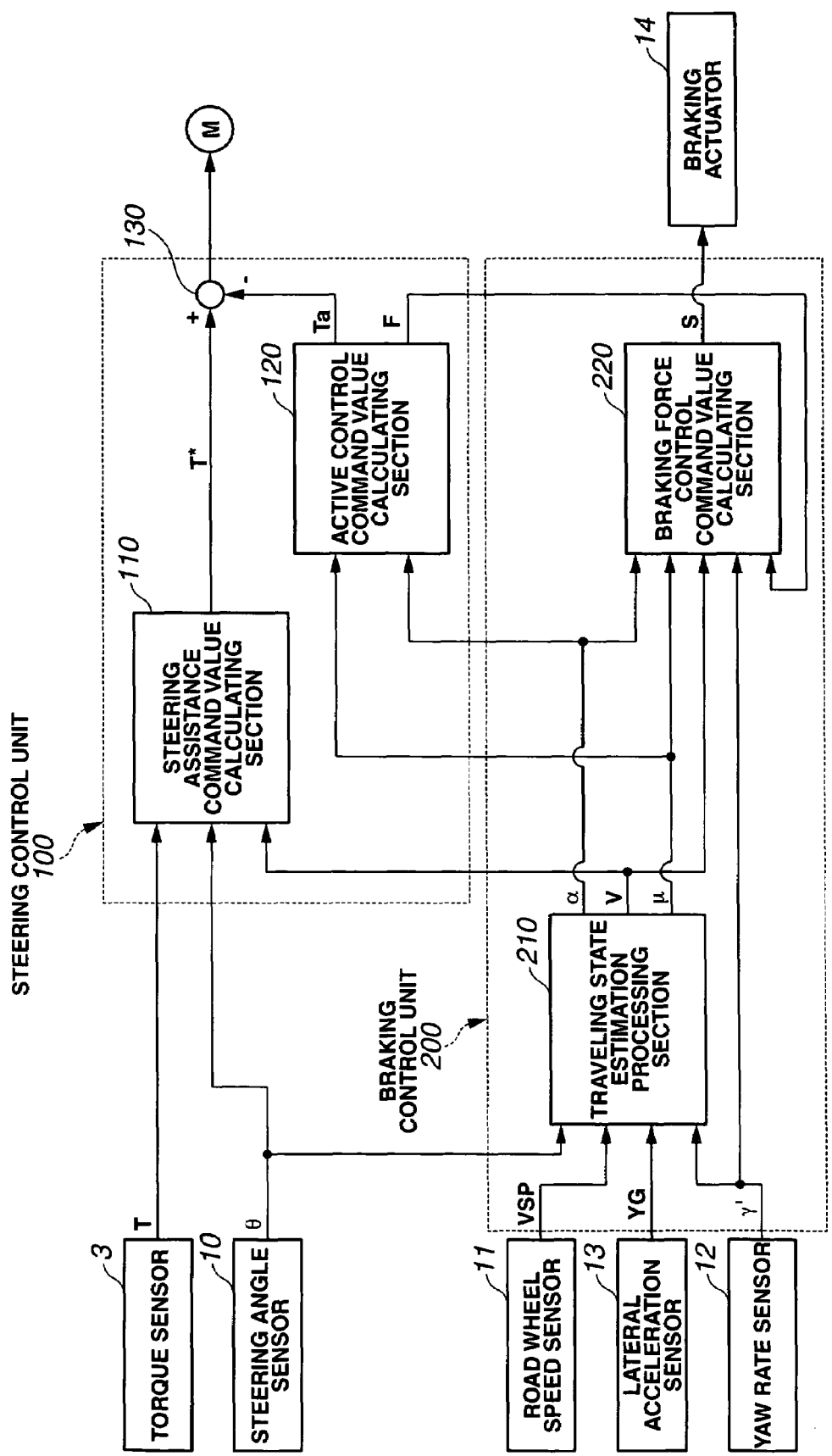
FIG. 2 is a schematic control block diagram of a steering control unit and a braking control unit.

FIG. 2 is a control block diagram of steering control unit 100 and braking control unit 200. Steering control unit 100 includes: a steering assistance command value calculating section 110; an active control command value calculating section 120; and an addition section 130 (actually a deviation calculator). Braking control unit 200 includes: a traveling state estimation processing section 210 (sideslip angle detecting section (means)); and a braking force control command value calculating section 220.

Traveling state estimation processing section 210 estimates a vehicle speed V, estimated road surface-to-tire frictional coefficient (a coefficient of a road surface frictional force) μ, and sideslip angle α on the basis of detected steering angle θ, road wheel speeds VSP, lateral acceleration YG, and yaw rate γ', outputs vehicle speed V to steering assistance command value calculating section 110, outputs estimated road surface-to-tire frictional coefficient μ and sideslip angle α to active control command value calculating section 120, and outputs all of V (vehicle speed), μ (road surface-to-tire frictional coefficient), and a (sideslip angle) to braking force control command value calculating section 220.

Steering assistance command value calculating section 110 calculates a target assistance torque command value T* from a torsion bar torque-versus-assistance torque command value map (refer to FIG. 7) on the basis of torsion bar torque T and vehicle speed V and outputs calculated target assistance command value T* to the addition section 130.

Active control command value calculating section 120 calculates an active control torque command value Ta on the basis of the estimated road surface-and-tire frictional coefficient μ and sideslip angle α and outputs calculated active torque command value Ta to addition section 130. In addition, an active control execution flag F is outputted to braking force command value calculating section 220.

Addition section 130 reverses a sign of active control torque command value Ta to be added to target assistance torque command value T*, the added result being outputted to motor M.

Braking force control command value calculating section 220 calculates a braking force control command value S on the basis of sideslip angle α, estimated road surface-and-tire frictional coefficient μ, vehicle speed V, yaw rate γ', and active control execution flag F and outputs braking force control command value S to braking actuator 14.

[Vehicular Motion (Dynamic) Control]

Figure 3:
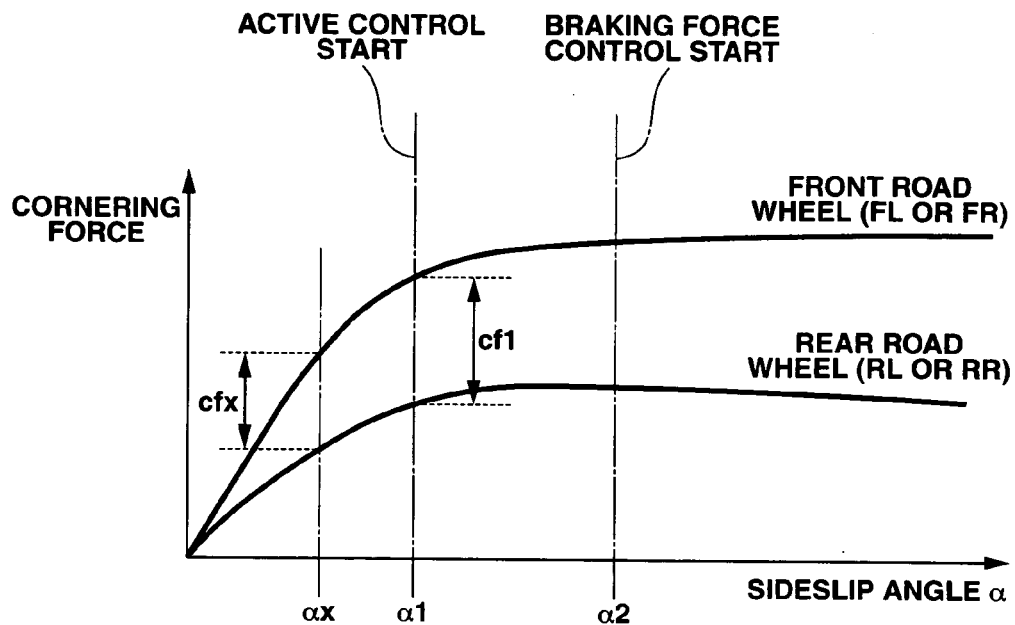
FIG. 3 is a characteristic graph representing a relationship between a vehicular sideslip angle α and a cornering force.
Figure 4:
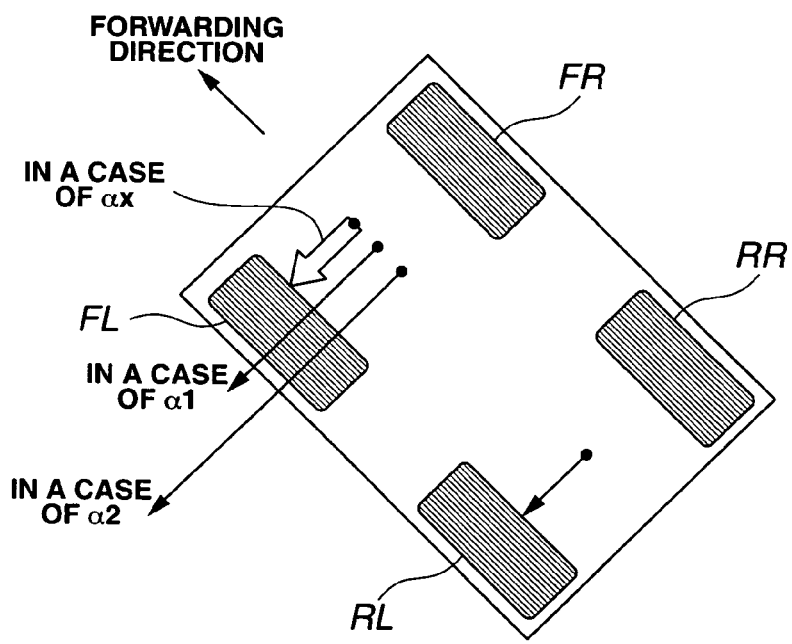
FIG. 4 is a schematic explanatory view representing a vehicular state during an oversteer state.

FIG. 3 shows a relationship between vehicular sideslip angle α and a cornering force of the vehicle and FIG. 4 exemplarily shows a vehicular motion of a vehicular oversteer state. Since a vehicular sideslip angle α and estimated road surface-and-tire coefficient μ are estimated on the basis of the detection value of lateral acceleration sensor 13, an error occurs in the detection value of lateral acceleration sensor 13 in the case where the vehicle is traveling on the corner cant road surface and road surface-and-tire coefficient μ is estimated to be lower than its actual value. That is to say, on the corner cant road surface, even if the actual value of sideslip angle α does not reach to α2, an erroneous detection of α2 is made due to the erroneous detection of lateral acceleration sensor 13. An unnecessary execution of the braking force control is, thus, forcefully executed and a traveling feeling that a vehicle driver gives (so-called, an unpleasant feeling that the vehicle driver gives to the vehicular driving) may be worsened.

It is herein noted that, in a case of the oversteer state, the cornering force developed on front road wheels FL, FR at the time of α1 (a first threshold value) is larger than that developed at rear road wheels RL, RR. Its difference between the front and rear road wheel cornering forces in the case of α1 is cf1 (refer to FIG. 3). Hence, if the steering operation is carried out to perform a counter steer, the vehicular sideslip angle can be decreased to αx shown in FIG. 3. The difference in the cornering forces on the front and rear road wheels is cfx (<cf1). Thus, it becomes possible to stabilize the vehicular motion by reducing the difference in the front and rear road wheel cornering forces. On the other hand, in a case where the vehicle is in an understeer state, the cornering force has reached to a limit of a tire performance and this a cornering performance (for example, a cornering response) of the vehicle cannot be improved any more even if an active steer is performed.

Hence, in the first embodiment, in addition to the steering control based on steering angle θ, vehicle speed V, and torsion bar torque T, vehicular sideslip angle is set to α1 in a case where the estimated road surface-and-tire coefficient μ is equal to or lower than the predetermined value and the vehicle is in the oversteer state. In a case where the vehicular sideslip angle α is equal to or larger than (wider) than a first threshold value α1, the active control is performed in a direction at which vehicular sideslip angle α is decreased (in a counter steer direction).

If, after the active control is carried out, vehicular sideslip angle estimated value is equal to or wider than α2, the braking force control is executed since there is a large tendency of the vehicular oversteer. However, if the vehicular sideslip angle estimated value is narrower (smaller) than α2, no braking force is executed. Thus, unnecessary braking force control based on the erroneous detection of lateral acceleration sensor 13 on the cant road surface can be avoided and the above-described unpleasant feeling is not given to the vehicular driver to improve the traveling feeling.

The steering assistance based on a target assistance torque command value T* calculated at steering assistance command value calculating section 110 is executed. To avoid the further increase in vehicular sideslip angle α by means of target assistance torque command value T*, addition section 130 adds active control torque command value Ta whose sign is inverted to target assistance torque command value T* to converge vehicular sideslip (or slip) at an earlier timing (refer to FIG. 2).

[Vehicular Motion Control Main Flow]

Figure 5:
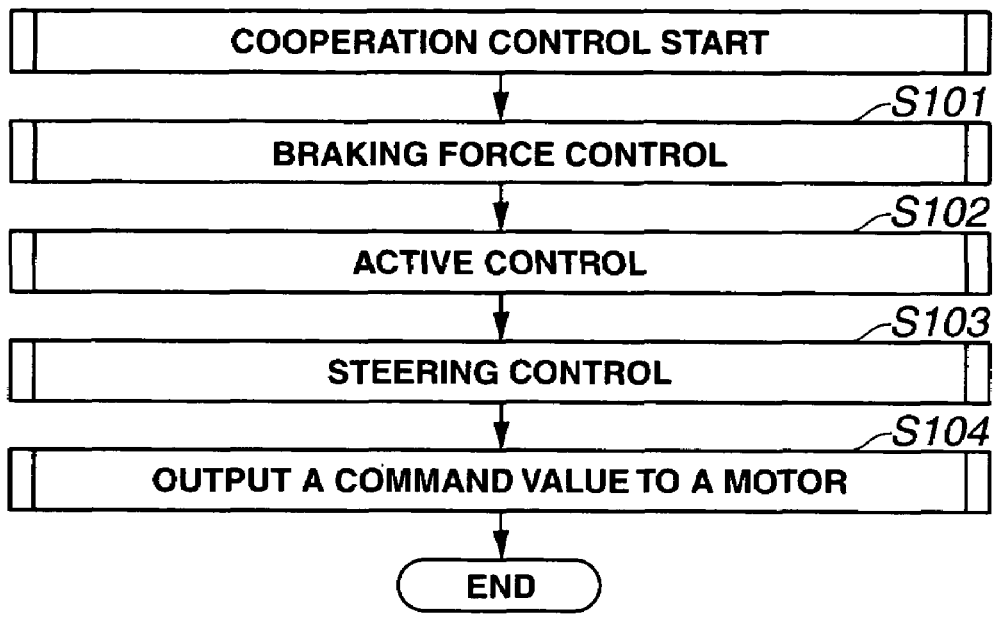
FIG. 5 is a main flowchart on a vehicular motion (dynamic) control.

FIG. 5 shows a cooperation (coordination) control, viz., a main flowchart on the vehicular motion control. Hereinafter, respective steps will be explained below. At a step S101, a braking force control is executed and the routine goes to a step S102. At a step S102, an active control is executed and the routine goes to a step S103. At step S103, the steering control is executed and the routine goes to a step S104. At step S104, a command is outputted to motor M and the control routine in FIG. 5 is ended.

[Steering Control Procedure]

Figure 6:
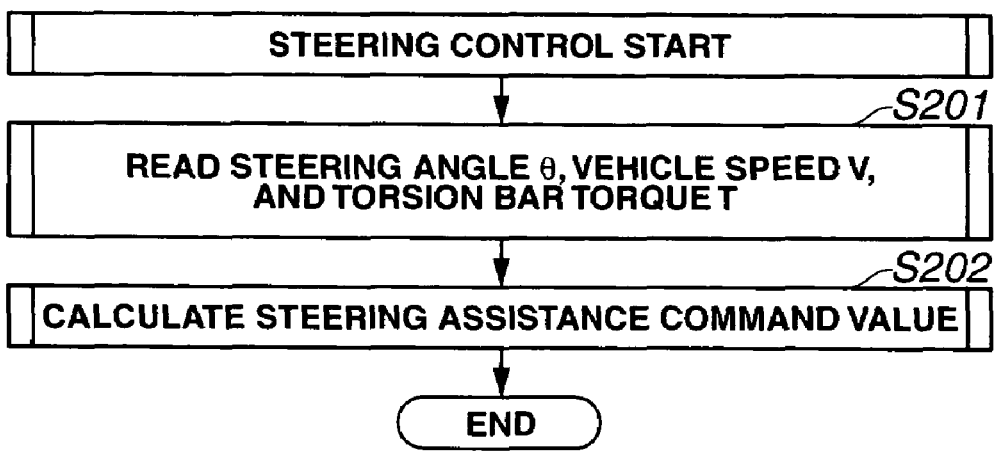
FIG. 6 is a flowchart representing a steering control processing.
Figure 7:
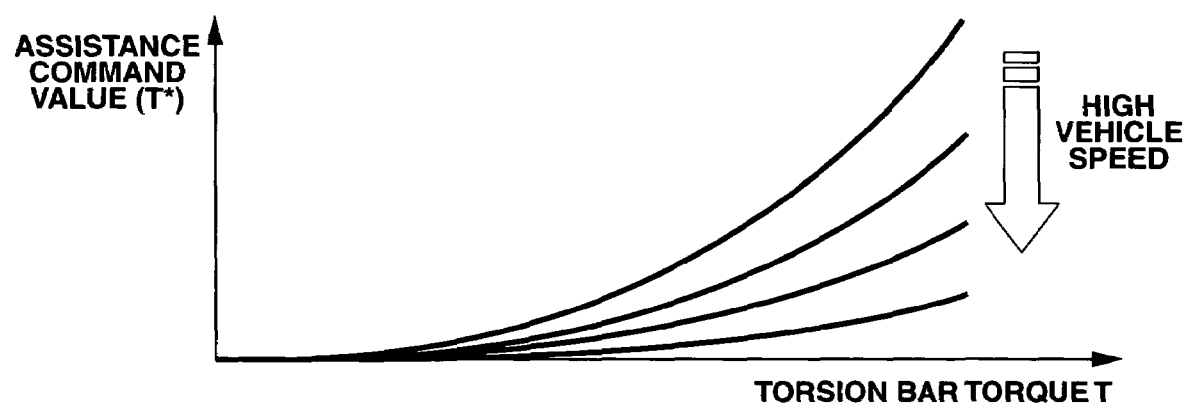
FIG. 7 is a torsion bar torque-versus-assistance torque command value map.

FIG. 6 is a steering control processing flow. At a step S201, steering control unit 100 reads steering angle θ, vehicle speed V, and torsion torque bar T and the routine goes to a step S202. At step S202, steering control unit 100 calculates target assistance torque command value T* from a steering torque-versus-assistance command value map (refer to FIG. 7) and the control routine of FIG. 6 is ended.

[Active Control Procedure]

Figure 8:
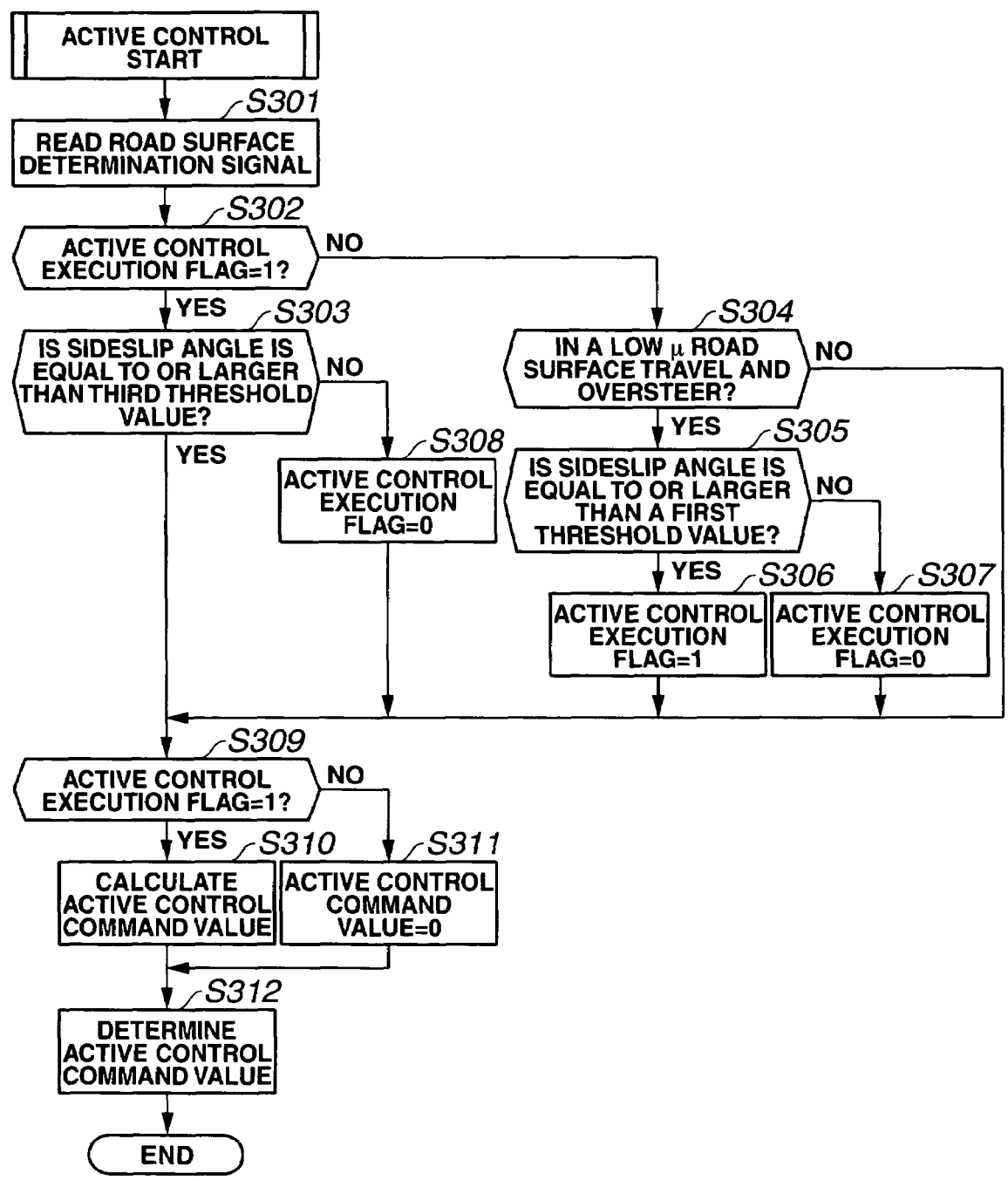
FIG. 8 is an active control processing flowchart.
Figure 9:
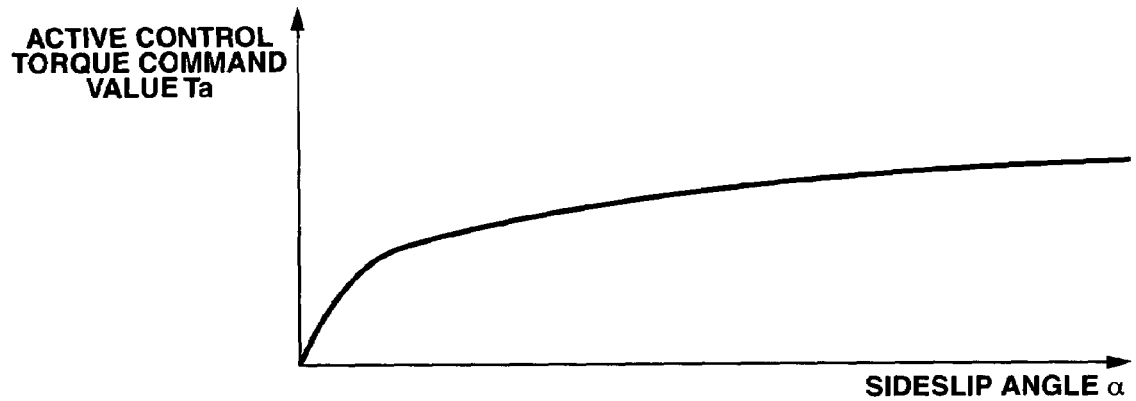
FIG. 9 is a sideslip angle-versus-active control torque command value map.

FIG. 8 shows an active control processing flow. If the threshold value to determine an execution of the active control is only first threshold value α1 and, in a case where sideslip angle α is present in a proximity to first threshold value α1, the active control interruptedly repeats ON and OFF so that the steering feeling by the vehicle driver may become worsened. Hence, in the first embodiment, a third threshold value (α3) is set to release the active control, third threshold value α3 being set to be smaller than first threshold value α1 as α3<α1, a control hunting is avoided to prevent the active control from being interruptedly executed (ON and OFF).

At a step S301, steering control unit 100 reads estimated road surface-and-tire frictional coefficient μ and the routine goes to a step S302. At step S302, steering control unit 100 determines if an active control execution flag F is set to 1. If Yes at step S302 (F=1), the routine goes to a step S303. If No at step S302 (F≠1), the routine goes to a step S304. At step S303, steering control unit 100 determines whether sideslip angle α is equal to or larger (wider) than third threshold value (α3). If steering control unit 100 determines that sideslip angle α is equal to or larger than third threshold value (α3) (Yes), the routine goes to a step S309. If No (α<third threshold value (α3)) at step S303, the routine goes to a step S308.

At step S304, steering control unit 100 determines whether the vehicle is traveling on a low frictional coefficient road surface and the vehicle state is in the oversteer state. If Yes (the vehicle is traveling on the low frictional coefficient road surface and the vehicle state is in the oversteer state) at step S304, the routine goes to a step S305. If No (the vehicle is traveling on a non-low frictional coefficient road surface or the vehicle state is not in the oversteer state) at step S304, the routine goes to a step S309.

At step S305, steering control unit 100 determines whether sideslip angle α is equal to or wider (larger) than first threshold value α1. If Yes (sideslip angle α is equal to or (wider) larger than first threshold value (α1) at step S305, the routine goes to a step S306. If No (sideslip angle α is narrower (or smaller) than first threshold value α1), the routine goes to a step S307.

At step S306, active control flag F is set to 1 and the routine goes to step S309.

At step S307, active control flag F is reset to 0 (F=0) and the routine goes to step S309.

At step S308, active control flag F is reset to 0 (F≠1) and the routine goes to step S309.

At step S309, steering control unit 100 determines whether active control flag F is set to 1 (F=1). If Yes (F=1) at step S309, the routine goes to a step S310. If No (F≠1) at step S309, the routine goes to a step S311.

At step S310, steering control unit 100 refers to a sideslip angle-versus-active control torque command value map (refer to FIG. 9) to determine an active control torque command value Ta and the routine goes to a step S312.

At step S311, steering control unit 100 sets active control torque command value Ta to 0 and the routine goes to step S312.

At step S312, steering control unit 100 determines the active control command value Ta and the control is ended.

[Braking Force Control Processing]

Figure 10:
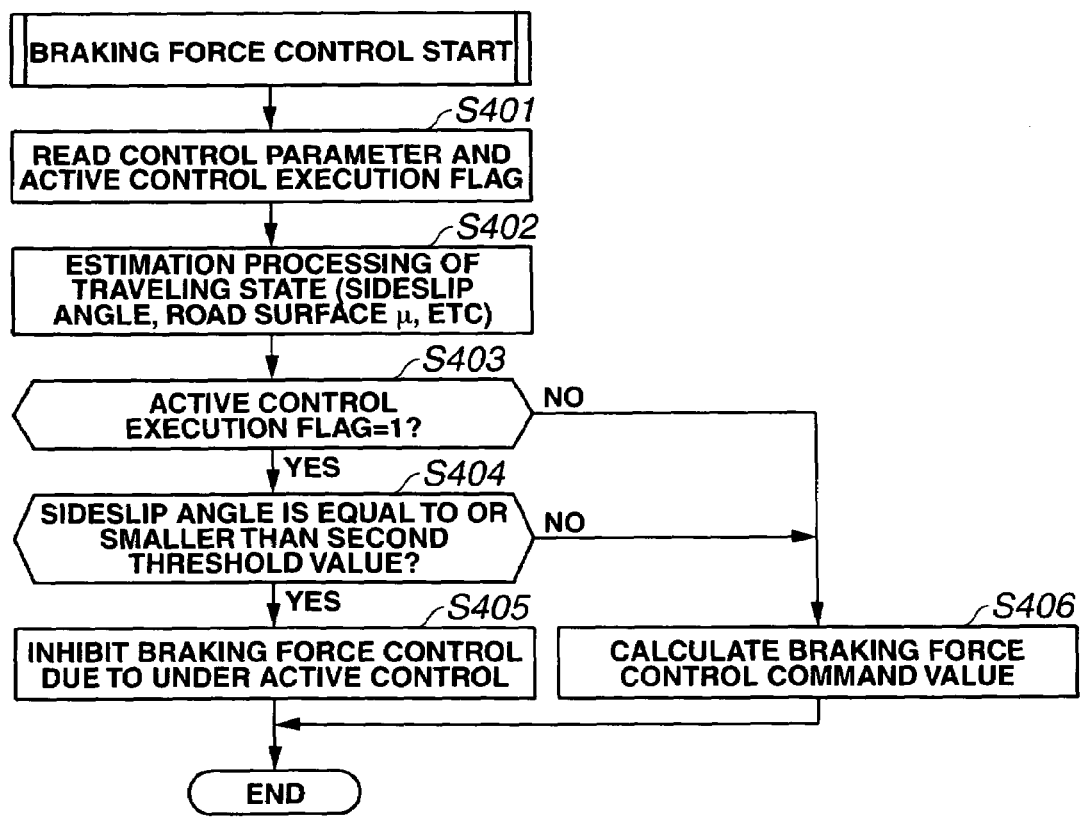
FIG. 10 is a braking force control processing flowchart.

FIG. 10 shows a processing flow of the braking force control. In the braking force control, the braking force is provided in a direction at which vehicular sideslip angle α is decreased. For example, suppose a case where, during the vehicular run on a turning road (or cornering), the vehicle slips and the steering assistance force is provided in a direction to decrease sideslip angle α. Even in this case, the braking force control performs a posture control of the vehicle to make a vehicular stability (vehicular safety) higher.

At a step S401, braking (force) control unit 200 reads respective control parameters (steering angle θ, road wheel speeds VSP, lateral acceleration YG, and yaw rate γ') and the routine goes to a step S402.

At step S402, braking control unit 200 estimates a traveling state (vehicle speed V, estimated road surface-and-tire frictional coefficient α, and sideslip angle α) and the routine goes to a step S403.

At a step S403, braking control unit 200 determines whether active control flag F is set to 1 (F=1). If Yes (F=1) at step S403, the routine goes to a step S404. if No (F≠1) at step S403, the routine goes to a step 5406.

At step S404, braking control unit 200 determines whether sideslip angle α is equal to or smaller than second threshold value (α2). If YES at step S404, the routine goes to a step S405. If NO at step S404, the routine goes to step S406. At step S405, a braking force control is inhibited and the control is ended.

At a step S406, braking force control command value S is calculated and the control shown in FIG. 10 is ended.

Comparison in Terms of Action and Advantage Between the Previously Proposed Driving Control Apparatus and the First Embodiment The previously proposed driving state detecting (driving control) apparatus described in the BACKGOUND OF THE INVENTION calculates the vehicular sideslip angle on the basis of the yaw rate, the lateral acceleration, and the vehicle speed and executes the braking force control of each of the front and rear left and right road wheels FL, FR, RL, RR on the basis of this vehicular sideslip angle to suppress the skid and/or the spin of the vehicle. However, since vehicular sideslip angle α and road surface-and-tire frictional coefficient μ are estimated on the basis of the detection value of the lateral acceleration sensor, in a case where the vehicle is running on the corner cant road surface, the error occurs in the detection value of the lateral acceleration sensor so tat the road surface frictional force is estimated to be lower than the actual value thereof. Hence, unnecessary braking force control is executed and the traveling feeling becomes worsened.

On the other hand, in the first embodiment, in addition to the steering control based on vehicle speed V and torsion bar torque T, vehicular sideslip angle α in a case where estimated road surface-and-tire frictional coefficient μ is equal to or lower than a predetermined value and the vehicle is in the oversteer state is set α1 (first threshold value) and, in a case where vehicular sideslip angle α is equal to or larger than first threshold value α1, the active control (the counter steer) is executed in the direction at which vehicular sideslip angle α is decreased. The braking force control is executed in a case where vehicular sideslip angle α is equal to or larger than a predetermined value (second threshold value α2). The braking force control is not executed in a case where a vehicular motion stabilization is possible only by means of the steering control.

Thus, the improvement of the traveling feeling can be achieved avoiding the unnecessary braking force control based on the erroneous detection of lateral acceleration sensor 12 in the case of the vehicular run on the corner cant road surface.

In addition, since second threshold value α2 to determine whether the braking force control is executed is set to be larger than first threshold value α1 to determine whether the active control is executed, the active control is always executed before carrying out the braking force control. Thus, an operation frequency of the braking force control can furthermore be reduced.

OTHER EMBODIMENT

Hereinabove, the best mode to carry out the present invention has been explained on the basis of the first preferred embodiment. A specific structure according to the present invention is not limited to the embodiment described above. The present invention includes various design modification in a scope which is not deviated from gist and scope of the present invention.

Furthermore, technical concepts other than the claims described in the appendix graspable from the respective embodiments will herein be explained together with their advantages.

(1) The vehicular driving control apparatus as claimed in claim 1, wherein the steering assistance section provides the steering assistance force in a direction at which a sum of a longitudinal force of each of the road wheels and a lateral force thereof is decreased when the direction at which the steering torque is decreased and the direction at which the vehicular sideslip angle is decreased are not coincide with each other. The advantage is that the vehicular posture is stabilized and a vehicular grip force can be recovered at an earlier timing.

(2) The vehicular driving control apparatus as set forth in item (1) described above, wherein the steering assistance section stops the provision of the steering assistance force in the direction at which the vehicular sideslip angle is decreased rather than a grip angle threshold value to develop the steering assistance force in the direction at which the sideslip angle is decreased.

In a case where the sideslip angle threshold value is set to only one, the steering assistance in the proximity to the threshold value is interruptedly carried out so that the steering feeling may be worsened. Thus, the sideslip angle threshold values are respectively set to the steering assistance start and the steering assistance stop and the sideslip angle threshold value which is set when the steering assistance is stopped is smaller than the sideslip angle threshold value which is set when the steering assistance is started. Thus, the interrupted control of the steering assistance can be prevented.

(3) The vehicular driving control apparatus as claimed in the claim 1, wherein the road wheel speed controlling section controls the braking force of each of the road wheels for the vehicular sideslip angle to be decreased when the sideslip angle is equal to or larger than the predetermined value.

For example, even in a case where the vehicle slips, for example, during the run on the turning road (cornering) and the steering assistance force is provided in the direction at which the sideslip angle is decreased, the vehicle safety (stability) can furthermore be increased by performing the posture control of the vehicle by means of the braking (force)

control. It is herein noted that the estimated road surface frictional force may specifically be interpreted as the estimated road surface-to-tire frictional coefficient μ (in a narrow sense of term).

This application is based on a prior Japanese Patent Application No. 2005-226058 filed in Japan on Aug. 4, 2005, the disclosures of which are hereby incorporated by reference. Various modifications and variations can be made without departing from the scope and the sprit of the present invention.

What is claimed is:

1. A vehicular driving control apparatus, comprising:
a sideslip angle detection circuit configured to detect a vehicular sideslip angle which is a difference between a vehicular forwarding direction and a steering direction of a steering wheel of the vehicle and configured to detect an oversteer state of the vehicle;
a steering assistance mechanism configured to provide a first steering assistance force for the steering wheel; and
a road wheel speed control mechanism configured to control at least one of a driving force and a braking force for each of road wheels of the vehicle to decrease a slip of the vehicle, the steering assistance mechanism developing a second steering assistance force in a direction at which the sideslip angle is decreased when the sideslip angle detection circuit detects the sideslip angle and the oversteer state, and the road wheel speed controlling mechanism controlling each of the road wheels to decrease the sideslip angle when the steering assistance mechanism develops the second steering assistance force in a direction to decrease the sideslip angle and the sideslip angle is equal to or larger than a predetermined value.

2. The vehicular driving control apparatus as claimed in claim 1, wherein the steering assistance mechanism develops the second steering assistance force in the direction at which the sideslip angle is decreased when the sideslip angle is equal to or larger than a first threshold value, and the road wheel speed controlling mechanism controls each of the road wheels to decrease a slip of the vehicle both when the steering assistance mechanism develops the second steering assistance force in the direction at which the sideslip angle is decreased and when the sideslip angle is equal to or larger than a second threshold value which is larger than the first threshold value.

3. The vehicular driving control apparatus as claimed in claim 2, wherein the steering assistance mechanism stops the provision of the second steering assistance force in the direction at which the sideslip angle is decreased when the sideslip angle is decreased and is below a third threshold value which is smaller than the first threshold value.

4. The vehicular driving control apparatus as claimed in claim 1, wherein the vehicular driving control apparatus includes a road surface frictional force estimation circuit configured to estimate a road surface frictional force and the steering assistance mechanism calculates the second steering assistance force on the basis of the road surface frictional force and the sideslip angle.

5. The vehicular driving control apparatus as claimed in claim 4, wherein the vehicular driving control apparatus further comprises a vehicle speed sensor configured to detect a vehicle speed, the steering assistance mechanism comprises a torque sensor configured to detect a steering torque, and the steering assistance mechanism calculates the first steering assistance torque on the basis of the vehicle speed and the steering torque.

6. The vehicular driving force control apparatus as claimed in claim 1, wherein the vehicular driving control apparatus further comprises: a vehicle speed sensor configured to detect a vehicle speed; and a yaw rate sensor configured to detect a yaw rate, the steering assistance mechanism includes a road surface frictional force estimation circuit configured to estimate an estimated road surface frictional force, and the road wheel speed control mechanism calculates a braking quantity of each of the road wheels on the basis of the sideslip angle, the estimated road surface frictional force, the vehicle speed, and the yaw rate.

7. The vehicular driving force control apparatus as claimed in claim 1, wherein the direction at which the sideslip angle is decreased is an opposite direction to the steering direction of the vehicle.

8. The vehicular driving control apparatus as claimed in claim 7, wherein the steering assistance mechanism develops a steering assistance force which is a sum of the first steering assistance force and the second steering assistance force when developing the second steering assistance force.

9. The vehicular driving force control apparatus as claimed in claim 1, wherein the vehicular driving force control apparatus further comprises a road surface frictional force estimating circuit configured to estimate the estimated road surface frictional force and wherein the steering assistance mechanism develops the second steering assistance force both when the sideslip angle of the vehicle is equal to or larger than a slip angle of the vehicle and in a case where the estimated road surface frictional force is equal to or smaller than a predetermined value and the vehicle is in the oversteer state.

10. The vehicular driving control apparatus as claimed in claim 1, wherein the steering assistance mechanism includes a torque sensor configured to detect a steering torque and the steering assistance mechanism provides the steering assistance force in a direction at which a sum of a road wheel longitudinal force and a road wheel lateral force is decreased when the direction at which the steering torque is decreased is not coincident with the direction at which the sideslip angle is decreased.

11. A vehicular driving control method comprising steps of a first step of providing a steering assistance force for steerable road wheels of the vehicle in a direction at which a sideslip angle is decreased when a vehicular sideslip angle which is a difference between a forwarding direction of the vehicle and a steering direction of a steering wheel of the vehicle is detected and a vehicular oversteer state is detected; and a second step of controlling each of road wheels of the vehicle to decrease the sideslip angle when the steering assistance force is provided in a direction at which the vehicular sideslip angle is decreased and when the sideslip angle is equal to or larger than a predetermined value.

12. The vehicular driving control method as claimed in the claim 11, wherein, at the first step, the steering assistance force is provided in the direction at which the sideslip angle is decreased when the sideslip angle is equal to or larger than a first threshold value and, at the second step, each of the road wheels of the vehicle is controlled to decrease a slip of the vehicle both when the steering assistance force is provided and the sideslip angle is equal to or larger than a second threshold value which is larger than the first threshold value.

13. The vehicular driving control method as claimed in claim 12, wherein the vehicular driving control method further comprises a third step of stopping the provision of the steering assistance force when the sideslip angle is s below a third threshold value which is smaller than the first threshold value.

14. The vehicular driving force control method as claimed in claim 11, wherein the steering assistance force at the first step is calculated on the basis of an estimated road surface frictional force estimated by a road surface frictional force estimating circuit and the sideslip angle.

15. The vehicular driving force control method as claimed in claim 11, wherein the direction at which a braking quantity of each road wheel at the second step is calculated on the basis of an estimated road surface frictional force estimated by a road surface frictional force estimating circuit, the sideslip angle, a vehicle speed, and a yaw rate.

16. The vehicular driving force control method as claimed in claim 11, wherein the direction at which the sideslip angle is decreased is opposite to a cornering direction of the vehicle.

17. The vehicular driving force control method as claimed in claim 11, wherein, at the first step, the steering assistance force is provided when the sideslip angle is equal to or larger than a vehicular slip angle in a case where an estimated road surface frictional force estimated by a road surface frictional force estimating circuit is equal to or smaller than a predetermined value and the vehicle is in the vehicular oversteer state.

18. A vehicular driving force control apparatus comprising:

sideslip angle detecting means for detecting a sideslip angle which is a difference between a forwarding direction of the vehicle and a steering direction of a steering wheel of the vehicle and detecting a vehicular oversteer state;

steering assistance means for providing a first steering assistance force for the steering wheel; and road wheel speed controlling means for controlling at least one of a driving force and a braking force of each of road wheels to decrease a slip of the vehicle, the steering assistance means, when the sideslip angle and the vehicular oversteer state are detected by the sideslip angle detecting means, developing a second steering assistance force in a direction to decrease the sideslip angle, and the road wheel speed controlling means developing the second steering assistance force both when the second steering assistance force is developed in a direction to decrease the sideslip angle and the sideslip angle is equal to or larger than a predetermined value.

19. A vehicular driving control apparatus comprising:

a sideslip angle detection circuit configured to detect a vehicular sideslip angle which is a difference between a forwarding direction of the vehicle and a steering direction of the vehicle and configured to detect an oversteer state of the vehicle; and a road wheel speed control mechanism for controlling at least one of a driving force and a braking force for each of road wheels of the vehicle to decrease a slip of the vehicle, the steering assistance mechanism detecting the sideslip angle by means of the sideslip angle detection circuit and developing the second steering force in a direction for the sideslip angle to be decreased when both the sideslip angle is detected and the vehicular oversteer state is detected by the sideslip angle detection circuit, and the road wheel speed controlling mechanism, when the steering assistance mechanism develops the second steering assistance force in the direction at which the sideslip angle is decreased and when the sideslip angle is equal to or larger than a predetermined value, controlling each of the road wheels to decease the sideslip angle.

* * * * *